United States Patent
Letz et al.

(10) Patent No.: US 9,313,208 B1
(45) Date of Patent: Apr. 12, 2016

(54) MANAGING RESTRICTED ACCESS RESOURCES

(71) Applicant: Amazon Technologies, Inc., Reno, NV (US)

(72) Inventors: Stefan Letz, Western Cape (ZA); Ross Bevan Engers, Western Cape (ZA); Daniel Bauman, Western Cape (ZA); Willem Jacob Buys, Western Cape (ZA); Timothy Ralph Sjoberg, Western Cape (ZA); Ronen Dov Agranat, Western Cape (ZA); Aidan Musnitzky, Western Cape (ZA); Joshua Mentz, Western Cape (ZA); Brian Frederick Mulder, Western Cape (ZA)

(73) Assignee: Amazon Technologies, Inc., Reno, NV (US)

( * ) Notice: Subject to any disclaimer, the term of this patent is extended or adjusted under 35 U.S.C. 154(b) by 37 days.

(21) Appl. No.: 14/219,930

(22) Filed: Mar. 19, 2014

(51) Int. Cl.
| | |
|---|---|
| G06F 21/00 | (2013.01) |
| G06F 15/16 | (2006.01) |
| H04L 29/06 | (2006.01) |
| G06F 21/62 | (2013.01) |
| G06F 21/60 | (2013.01) |
| G06F 21/33 | (2013.01) |

(52) U.S. Cl.
CPC .............. *H04L 63/104* (2013.01); *G06F 21/33* (2013.01); *G06F 21/604* (2013.01); *G06F 21/62* (2013.01); *H04L 63/08* (2013.01); *H04L 63/0807* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 9,038,152 B1 * | 5/2015 | Vazquez | ................. | H04L 63/08 726/10 |
| 2004/0215578 A1 * | 10/2004 | Das | ....................... | G06F 9/5027 705/77 |
| 2008/0215509 A1 * | 9/2008 | Charlton | ........................ | 706/11 |
| 2010/0100952 A1 * | 4/2010 | Sample | ............... | H04L 12/5835 726/9 |
| 2010/0162389 A1 * | 6/2010 | Burger et al. | ................... | 726/21 |
| 2010/0251339 A1 * | 9/2010 | McAlister | ......................... | 726/4 |
| 2011/0119486 A1 * | 5/2011 | Boldyrev et al. | ............. | 713/156 |
| 2011/0126207 A1 * | 5/2011 | Wipfel et al. | ................. | 718/104 |
| 2011/0231921 A1 * | 9/2011 | Narayanan | ............ | G06F 21/335 726/9 |
| 2012/0060207 A1 * | 3/2012 | Mardikar | ................ | G06F 21/33 726/4 |
| 2013/0014120 A1 * | 1/2013 | Ross | ............................ | 718/104 |
| 2013/0029641 A1 * | 1/2013 | Hickie | .................. | G06F 21/604 455/411 |
| 2013/0086211 A1 * | 4/2013 | Sondhi | ............... | H04L 63/0815 709/217 |
| 2013/0219176 A1 * | 8/2013 | Akella et al. | .................. | 713/165 |
| 2013/0227285 A1 * | 8/2013 | Bracher et al. | ................ | 713/168 |
| 2014/0123312 A1 * | 5/2014 | Marcotte | ......................... | 726/28 |
| 2014/0317681 A1 * | 10/2014 | Shende | ............................ | 726/1 |

* cited by examiner

*Primary Examiner* — Jason K. Gee
*Assistant Examiner* — Olanrewaju Bucknor
(74) *Attorney, Agent, or Firm* — Hogan Lovells US LLP

(57) ABSTRACT

Entities such as resource and service providers can utilize a ticketing system to define operational actions as primitives that can be stored, combined into more complex workflows, and executed in a restricted zone wherein a portion of the resources or services are not directly accessible to those providers. These primitives can be stored in the provider environment and shared with the restricted zone, in order to provide a structured approach to the sharing of operational knowledge. When a primitive is first received to the restricted zone, a person vetted by the customer associated with the restricted zone can review and approve the primitive, and can cause the primitive to be executed in the restricted zone. When that same primitive is subsequently received to the restricted zone, a lookup can be performed to determine that an approval exists, whereby the primitive can be executed in the restricted zone without another review.

20 Claims, 8 Drawing Sheets

MANAGING RESTRICTED ACCESS RESOURCES

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

It might be the case, however, that a customer will have applications that relate to, or utilize, sensitive data, such that the customer will not want the provider of the resources to have access to the information, or the provider may in fact be legally prevented from having access to the data. Conventional cloud management approaches thus cannot be utilized as the persons, resources, and applications typically responsible for managing the resources in a restricted zone will not have direct access to any of the resources in that restricted zone. Further, conventional approaches to sending management requests to the resources in that zone cannot be utilized as certain names, structures, or conventions used in the restricted zone will be undiscoverable outside that zone, such that complete and accurate instructions cannot be provided. The people inside the restricted zone also typically will not have the knowledge and/or information needed to properly operate and update the resources of the provider from within the restricted zone.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing aspects of resources in an electronic environment. In particular, various embodiments enable the management of resources to which access is at least partially restricted. As mentioned above, a resource provider might provide a set of resources of one or more types that are able to be utilized by multiple clients, such as may be part of a multi-tenant, shared resource, or "cloud" offering. There might be client data stored on, or processed by, at least some of those resources to which the provider is not to have access. Conventional approaches would prevent the successful management of resources in such a restricted zone (real or virtual), as some of the information needed for management would not be available outside the restricted zone. Approaches in accordance with various embodiments provide management mechanisms for resources in such a zone by using, for example, a primitive generation, selection, and approval process. A provider of resources and/or services, for example, can define operational actions as primitives, which can be stored individually or combined into more complex workflows. These primitives can be submitted to resources in a restricted zone, such as through submission of a work "ticket." A component and/or person in the restricted zone can review the ticket and approve or deny the primitive(s) and/or workflow(s) associated with the ticket. The necessary data from the restricted zone can be inserted into the appropriate primitives which then can be executed in the restricted zone. Once a primitive is approved, the approval can be stored both in the restricted zone and outside the restricted zone in the provider environment. Subsequent submissions of that primitive then can be executed without review in the restricted area. Such approaches can provide a structured and centralized place for the storing and sharing of operational knowledge. Such approaches can also help to reduce the likelihood of human error, provide faster results and feedback, and simplify the overall the management process by reducing the amount of knowledge and number of tasks needed for operators of resources in a restricted zone.

Various other applications, processes and uses are presented below with respect to the various embodiments.

Figure 1:
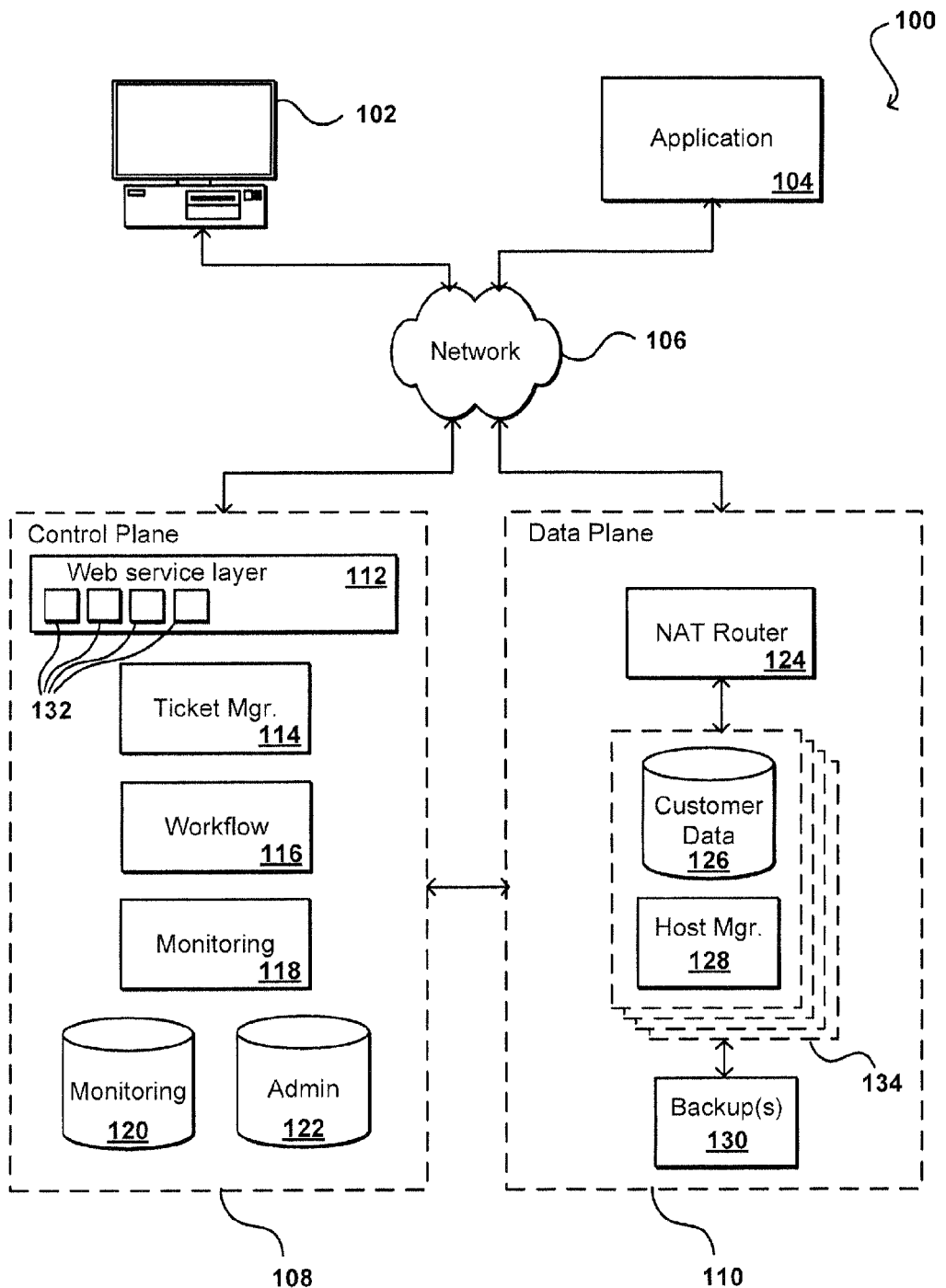
FIG. 1 illustrates an environment in which various embodiments can be implemented.

FIG. 1 illustrates an example resource provider environment 100 that can be utilized in accordance with various embodiments. The resource provider environment 100 can include various resources, systems, and components to provide a resource management service that enables developers, customers, and/or other authorized users to easily and cost-effectively obtain, configure, and manage various resources, such as servers, relational databases, and the like. While this example is discussed with respect to the Internet, Web services, and Internet-based technology, it should be understood that aspects of the various embodiments can be used with any appropriate services available or offered over a network in an electronic environment. A management service can enable the utilization of resources without customers having to worry about the administrative complexities of tasks such as deployment, upgrades, patch management, backups, replication, failover, capacity management, scaling, and other such aspects of resource management.

The example resource provider environment 100 illustrated utilizes a separate "control plane" that includes components (e.g., hardware and software) useful for managing aspects of the various resources. In one embodiment, a set of data management application programming interfaces (APIs) or other such interfaces are provided that allow a user or customer to make calls into the provider environment to perform certain tasks relating to the resources. The user still can use the direct interfaces or APIs to communicate with the resources, however, and can use specific APIs of the control plane only when necessary to manage the resources or perform a similar task.

In the example of FIG. 1, a computing device 102 for an authorized user is shown to be able to make calls through a network 106 into a control plane 108 to perform a task such as to update software on a server of the data plane 110. The user or an application 104 in many instances can access the resource for certain non-management tasks directly through an interface of a data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 108 in this example is essentially a virtual layer of hardware and software components that handles control and management actions, such as provisioning, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web service calls or requests from across the network 106. Each API can be provided to receive requests for at least one specific action to be performed with respect to the data environment, such as to provision, scale, clone, or hibernate an instance of a relational database. Upon receiving a request to one of the APIs, the Web services layer can parse or otherwise analyze the request to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 122, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "ticket manager" component 114. A ticket manager component can be any appropriate component operable to determine any tasks to be executed in response to an outstanding request. In this example, the Web services layer might place instructions or information for a request in a job queue, and the ticket manager can identify the outstanding request and determine any tasks corresponding to the request. Various other approaches can be used as would be apparent to one of ordinary skill in the art, such as the Web services layer sending a notification to a ticket manager that a job exists. The ticket manager component can identify the request, and using information for the request can send a request, call, or other such command to a workflow component 116 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein.

An example workflow for a customer might include tasks such as provisioning a data store instance, allocating a volume of off-instance persistent storage, attaching the persistent storage volume to the data store instance, then allocating and attaching a DNS address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 110, and provide the DNS address to be used to access the instance. A user then can access the data store instance directly using the DNS address and port, without having to access or go through the control plane 108. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process.

The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service. The reply can provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 108 in this embodiment also includes at least one monitoring component 118. When a data instance is created in the data plane, information for the instance can be written to a data store in the control plane, such as a monitoring data store 120. It should be understood that the monitoring data store can be a separate data store, or can be a portion of another data store such as a distinct set of tables in an Admin data store 122, or other appropriate repository. A monitoring component can access the information in the monitoring data store to determine active instances 134 in the data plane 110. A monitoring component also can perform other tasks, such as collecting log and/or event information from multiple components of the control plane and/or data plane, such as the Web service layer, workflow component, ticket manager component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 134 in the data plane can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades for the data store and/or operating system. A host manger also can collect relevant metrics, such as may relate to CPU, memory, and I/O usage.

The monitoring component can communicate periodically with each host manager 128 for monitored instances 134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 122 or another such job queue to perform an action for the instance, such as to verify the problem and re-provision the instance if necessary. The ticket manager can access this information and kick off a recovery workflow for the instance to attempt to automatically recover from the failure. The host manager 128 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 110 to directly interact with that instance 134. In one embodiment the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. As discussed, each instance 134 can include a host manager 128 and a data store 126, and can have at least one backup instance or copy in persistent storage 130. Using such an approach, once the instance has been configured through the control plane, a user, application, service, or component can interact with the instance directly through requests to the data plane, without having to access the control plane 132. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 108 can be offered as at least one service by a provider that may or may not be related to a provider of the data plane 110, but may simply be a third-party service that can be used to provision and manage data instances in the data plane, and can also monitor and ensure availability of those instances in a separate data plane 110.

As discussed, however, it is possible that a customer will want to utilize a set of resources or services provided through the resource provider environment, but is unwilling or unable to grant access to the data to be stored and/or processed by those resources or services. Further, in some cases the customer might not want anyone outside the customer's control to have any direct access to the resources at all. For example, an airport might use server capacity and data capacity for flight control or a municipality might use such resources for voting, ballot, or election purposes. There might be legal restrictions on access, in addition to any preferences or policies of the customer. Using conventional approaches the ability of such a customer to utilize a resource provider environment would be limited at best.

Figure 2:
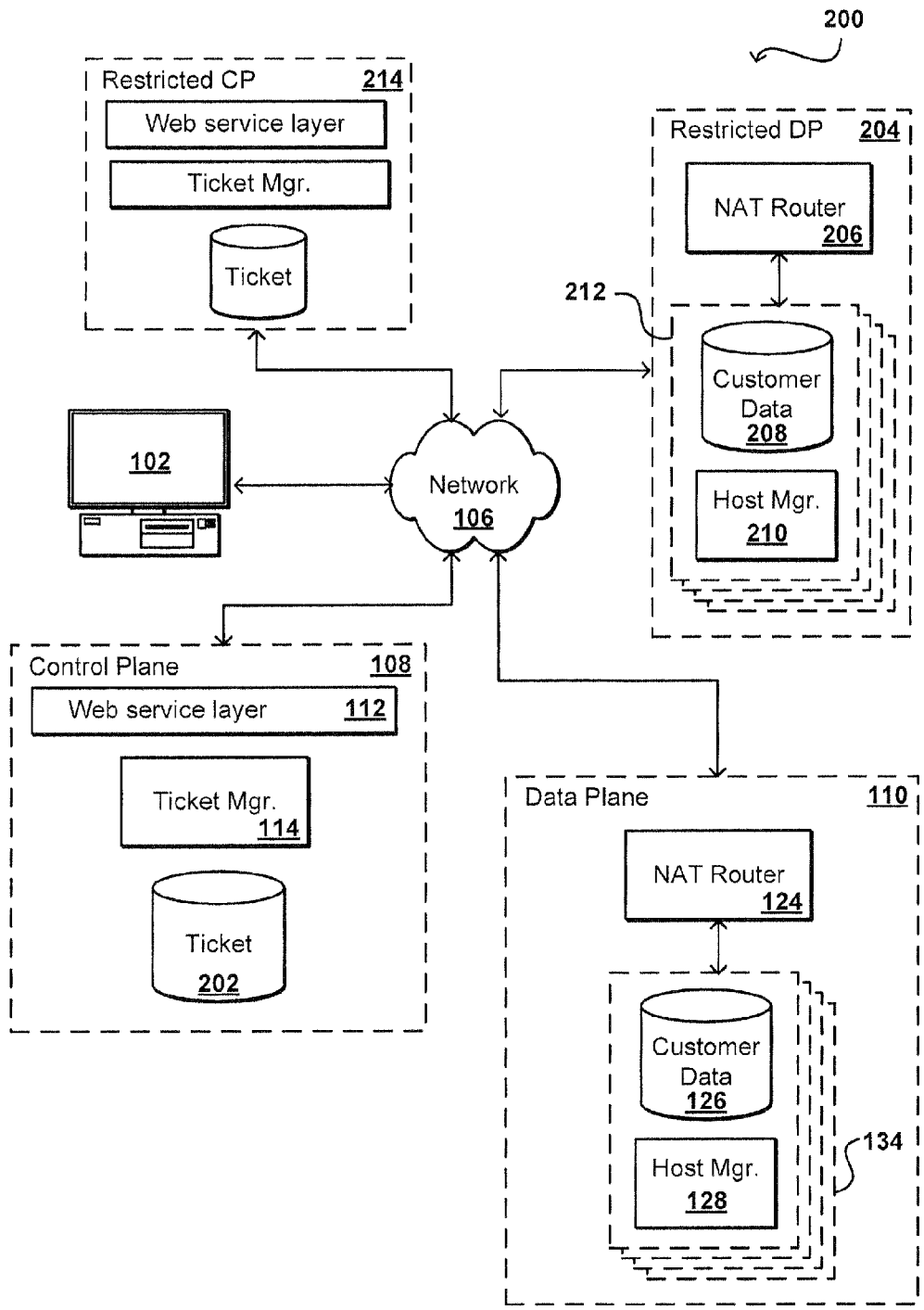
FIG. 2 illustrates an example situation in which various resources of the data plane are located in a restricted zone in accordance with various embodiments.

FIG. 2 illustrates an example situation in which various resources 200 of the data plane are located in a restricted zone in accordance with various embodiments. One way to provide resources to such a customer is to segment (physically or virtually) the data plane (and in some cases the control plane as well) into the general provider environment and one or more restricted zones 204, 214. In a physical segmentation a specific set of resources (e.g., a NAT router 206 and servers or server instances 212, each associated with a host manager 210 and potentially data storage 208) in a designated physical location can be allocated to a particular customer, with only people having appropriate credentials from the customer having access to those resources. A credential provided to a vetted person in the restricted zone can take any appropriate form, such as a keycard or status level, among others. In some embodiments, a similar segmentation of resources can be used to provide a restricted control plane 214 that can call into the restricted data plane 204 in order to manage resources within the restricted zone(s). In a virtual segmentation, the resources of the restricted region 204 can be intermixed with the resources of the general data plane 110, except that access to a subset of those resources will be restricted to credentials of the customer when the resources of that subset are allocated to the customer as part of the restricted zone. A potential benefit to the virtual segmentation is that additional resources can be added, or resources changed or removed, as needed to provide better resource utilization. In some situations, however, the customer may not allow such usage for fear that information from one of those resources will be recoverable by a different customer subsequently provisioned on one of those resources, etc.

The assigning of a subset of resources to a restricted zone 204, however, does not solve the issue of how to manage those resources without being able to directly access those resources or extract the necessary data from within the restricted zone 204. While the resource provider might keep a redundant set of data in the general data plane 110 to have an idea of what exists in the restricted data plane 204, the provider will still be limited in the accuracy of the redundant set.

Approaches in accordance with various embodiments can enable the management of resources in such a restricted zone 204 through the use of various primitives. A "primitive" as used herein refers to an operational action that can be performed with respect to a resource. A primitive can be generated by a resource manager, for example, who might not have access to resources in the restricted zone. The primitive can be submitted to the restricted zone, where any restricted data can be filled in so as to enable the primitive to be executed in the restricted zone. As mentioned, primitives can be combined into more complex workflows that can be submitted to the restricted zone. Copies of the primitives and/or workflows can also be stored in the control plane 108 or general data plane 110, among other appropriate locations. The primitives provide a way to pass information to the restricted zone 204 for management of the resources in the restricted zone.

Examples of resources that can be managed in the restricted zone 204 include, for example, servers and networking hardware (e.g., network routers and switches), firmware, operating system software, middleware, application software, security service, and higher-level services provided by third parties. Examples of primitives that can be generated for these resources include obtaining data from the console of a server, updating the firmware of a network router, logging into the operating system of a host and executing a set of commands (e.g., ping, DNS resolution, or traceroute), deploying new software to hosts, updating existing software on hosts, gathering log data from hosts, modifying the configuration of resources and services, and managing (e.g., creating, modifying, and propagating) credential sets. The primitives (or operational actions) can take any appropriate form, such as an API command for Web services.

These primitives can be created by persons associated with the resource provider environment. An advantage to having such a person generate the primitives is that the management and operation of resources and services in a cloud environment is an often manual, difficult, and error-prone task. The resources and services are typically complex, are then logically and physically distributed, and tend to have a large number of dependencies. The knowledge of how to maintain and operate these resources and services generally will only exist in the people who manage the resources on behalf of the provider, or is captured in textual playbooks that describe specific scenarios and actions. The people with this knowledge are generally not employed by customers who require a restricted cloud environment (e.g., GovCloud), where resource and/or service owners or providers have no direct access to their resources and/or services.

A user 102 can select one or more of these primitives for submission to the restricted zone 204. As discussed, this can involve generating a virtual "ticket" that can be submitted to the appropriate address or interface of the restricted zone 204. In some embodiments, the user will still interact with the control plane 108 to generate the ticket via a ticket manager 114, which can then cause the ticket to be submitted to the appropriate address of the appropriate restricted zone 204. Information for the ticket can be stored locally, such as in a ticket repository 202, which can also store information about existing primitives and workflows, among other related data.

When a ticket is received to the restricted zone, an appropriate console or other such component can enable vetted personnel to review, approve, and execute the primitives or workflows in the restricted zone 204. The console will also enable such a person to reject or deny any primitives associated with a ticket as well. Once a primitive is approved, information for the approval and the primitive can be stored in the restricted zone, such as to an approval repository as discussed later herein. Information for the approval can also be sent back to the ticket manager 114, such that the components of the control plane can have information about the current state of the resources in the restricted zone and information about approved primitives can be available through the control plane, as may also be stored in the ticket repository.

Figure 3:
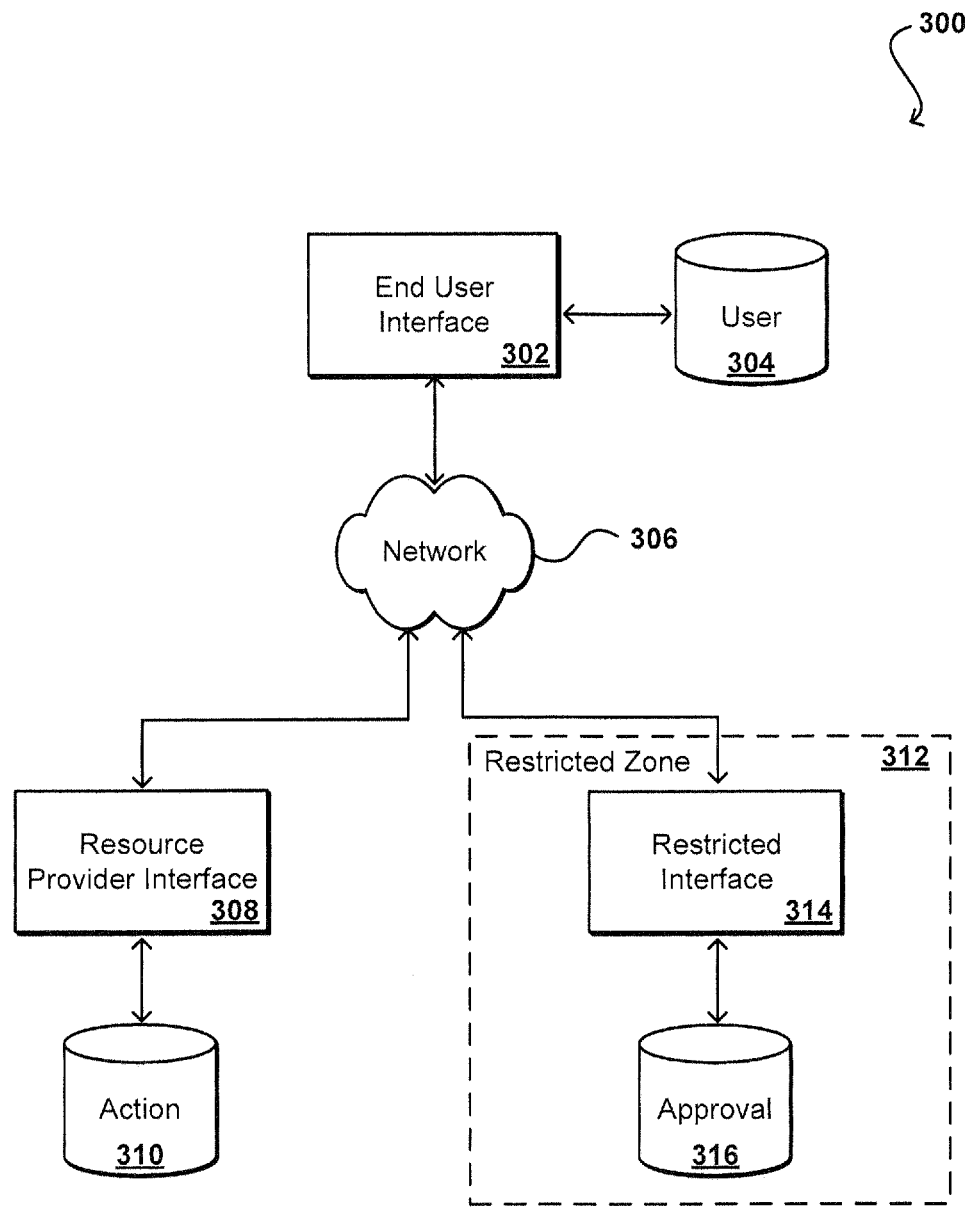
FIG. 3 illustrates an example set of components that can be used to enable tickets to be generated and submitted to a restricted zone in accordance with various embodiments.

FIG. 3 illustrates a set of example components 300 that can be utilized to implement such an approach in accordance with various embodiments. In this example, a person authorized to manage resources in the provider environment can access a resource provider interface 308, which could be part of an application or Web interface of the control plane in various embodiments. The resource provider interface can enable the defining, testing, and storing of primitives or other operational actions. The interface 308 can also enable multiple primitives to be combined into one or more workflows, which can also be tested and stored through the provider interface. The primitives and/or workflows in at least some embodiments can be stored to an action repository 310 of the resource provider environment. The primitives and workflows in at least some embodiments are stored to the repository 310 in a hierarchical fashion.

Once a primitive is stored in the action repository 310, for example, that primitive can be exposed, or otherwise made available, across at least one network 306 to an authorized user through an end user interface 302. The end user interface 302 can enable authorized users to perform actions such as to browse, search, and select primitives and workflows to be executed. Upon one or more primitives or workflows being selected, a ticket can be generated and sent to the restricted zone 312, such as may be sent to an API of an interface layer of the restricted zone. In response, information about the execution of the ticket can be received and made available to the user through the end user interface 302. The information can indicate whether any or all of the primitives were executed, as well as information about any that were not executed. In some cases one or more reasons for a primitive not being executed can be provided, although the execution results can be filtered in at least some instances in order to protect or redact sensitive data prevented from leaving the restricted zone. A user repository 304 or other such storage device or service can store information such as the history of executed primitives and workflows along with the (potentially filtered) results.

A restricted interface 314 can be provided within the restricted (or otherwise isolated) zone 312. The restricted interface can be accessible using credentials available to people vetted and/or authorized to access data and resources within the restricted zone. The interface can enable vetted personnel to perform tasks for received tickets, such as to review, approve, deny, and execute primitives and workflows indicated by the received tickets (or otherwise identified), as well as to audit any actions taken in the restricted zone. Information about the approvals, denials, workflows, and primitives can be stored in an approval repository 316 or other storage within the restricted zone. Information about the approvals or denials can also be sent to the action repository 310 or another appropriate location available outside the restricted zone. When a primitive or workflow is subsequently received to the restricted zone 312 as part of a ticket, a check can be made to determine if an approval already exists for that primitive or workflow in the approval repository 316. If so, the primitive or workflow can be executed in the restricted environment without the need for another approval through the restricted interface 314.

A user of the restricted interface 314 can be able to filter primitives by ones that have not yet been approved. Those primitives can then be verified and, if the user has the right permissions, the user can approve the primitive to cause it to be stored as an approved primitive. If received with a ticket, the corresponding operation(s) can also be executed in the restricted zone. The ticket can have been received from an appropriate external source or from within the restricted zone as part of normal operations. There might be different levels of approval for different primitives, types of resources, etc. The primitives also can be utilized for execution outside the restricted zone as desired.

As mentioned, persons associated with the provider environment but not vetted by the customer of the restricted zone will generally not be able to perform tasks such as logging in to host machines in the restricted zone, even though the hosts are provided as part of the resource provider offering. The inability to gain access will prevent those persons from being able to manage those resources directly, instead requiring people with access to resources in the restricted zone to manage on behalf of the provider. The tickets provide a mechanism through which people with operational knowledge of the provider environment can pass that knowledge into the restricted zone, enabling people with access to the restricted zone to actually implement and execute the appropriate management tasks. Each time a task is confirmed to have been performed in the restricted zone, a similar task can be performed outside the restricted zone in order to have a mirrored version to use for purposes such as testing and configuration.

As mentioned, in many cases some of the information needed to execute a primitive will not be available outside the restricted zone. Accordingly, some of the primitives generated outside the restricted zone can include "placeholders" or other elements that are to be replaced with accurate information when provided to a person or resource with sufficient authority in the restricted zone. For example, a primitive might have a "region" or "hostname" placeholder, which would need to have the appropriate region or hostname data inserted in the restricted zone before being executed. Other placeholders can represent information such as names, addresses, and endpoints. Primitives can be pre-approved in at least some instances without the placeholders being filled in. It at least some embodiments, rollback commands for each primitive can also be approved for execution. Various restrictions can also be attached to the approval, such as approval for specific hosts or types of resources, etc.

There can also be various policies, authorized inside or outside the restricted zone, that can help indicate whether certain primitives should be authorized. Policies can be used to potentially whitelist or blacklist certain operations. The policies can address various attributes of the primitives, and can specify types of commands that can be executed against certain resources, the teams that can cause those commands to be executed, etc. Multiple parties can work together to generate a policy, such as an "outsider" with operational knowledge about the provider environment and an "insider" with knowledge about the restricted zone. For example, the outside party with the knowledge can generate general policies, and then a person inside the restricted zone can modify or add policy portions that are zone specific. In some cases each person might have to approve any policy changes made by the other, where allowed by restriction. There also can be separate policies on how to provide a primitive from outside the zone and then other policies indicating what can be executed or approved within the zone. There also can be policies on the types of data that can leave the zone, and the types of data or information (such as account or IP address information) to be stripped from the data before passing outside the zone.

Figure 4:
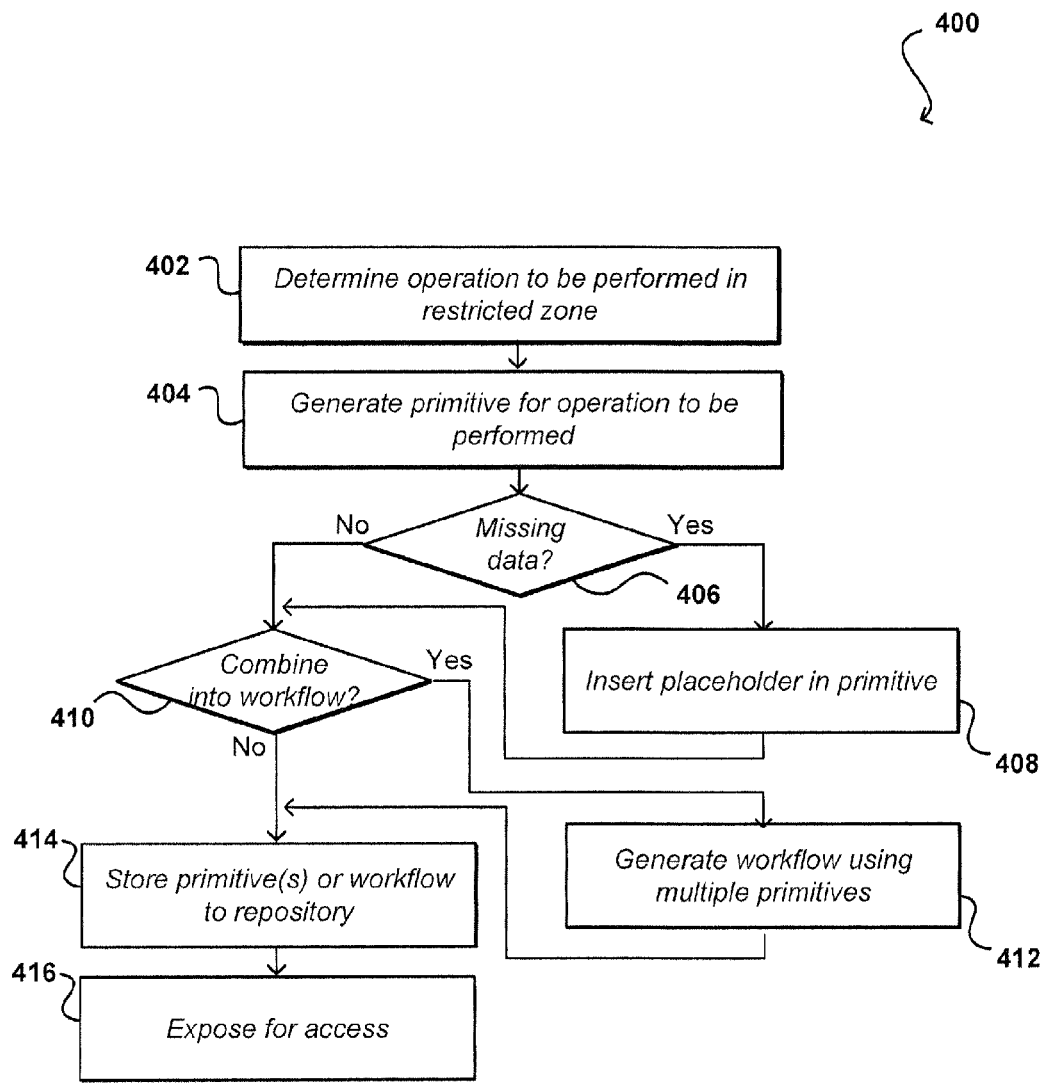
FIG. 4 illustrates an example process for generating primitives that can be used in accordance with various embodiments.

FIG. 4 illustrates an example process 400 for generating primitives and workflows that can be executed in a restricted or unrestricted zone in accordance with various embodiments. It should be understood that, for any process discussed herein, there can be additional, fewer, or alternative steps performed in similar or alternative orders, or in parallel, within the scope of the various embodiments unless otherwise stated. In this example, at least one operation is determined 402 that is to be executed against a resource in a restricted zone. As discussed elsewhere herein, such an operation can be executed on resources outside a restricted zone as well in at least some embodiments. Once at least one operation is determined, a primitive can be generated 404 for each operation (or group of operations). The primitive can take any appropriate form, such as an API command or Web service call, among others. A determination can be made 406 as to whether a complete primitive can be generated for execution, or whether the primitive will be missing data that is unable to be sent outside the restricted zone. If the primitive is missing data, such as a resource name or address, a placeholder can be inserted 408 in the primitive in place of each instance of missing data. Other approaches can be used as well in accordance with various embodiments.

As discussed, in some embodiments it may make sense for a set of operations to be performed together. As such, multiple primitives may advantageously be combined into a selectable workflow. If it is determined 410 that there are primitives to be combined into a workflow, a workflow can be generated 412 using the primitive and other related primitives specified by the user, identified by the system, or otherwise selected. The generated primitives and/or workflows then can be stored 414 to a repository and exposed 416 for access, such as by a user, customer, application, resource, or other such entity or component.

Figure 5:
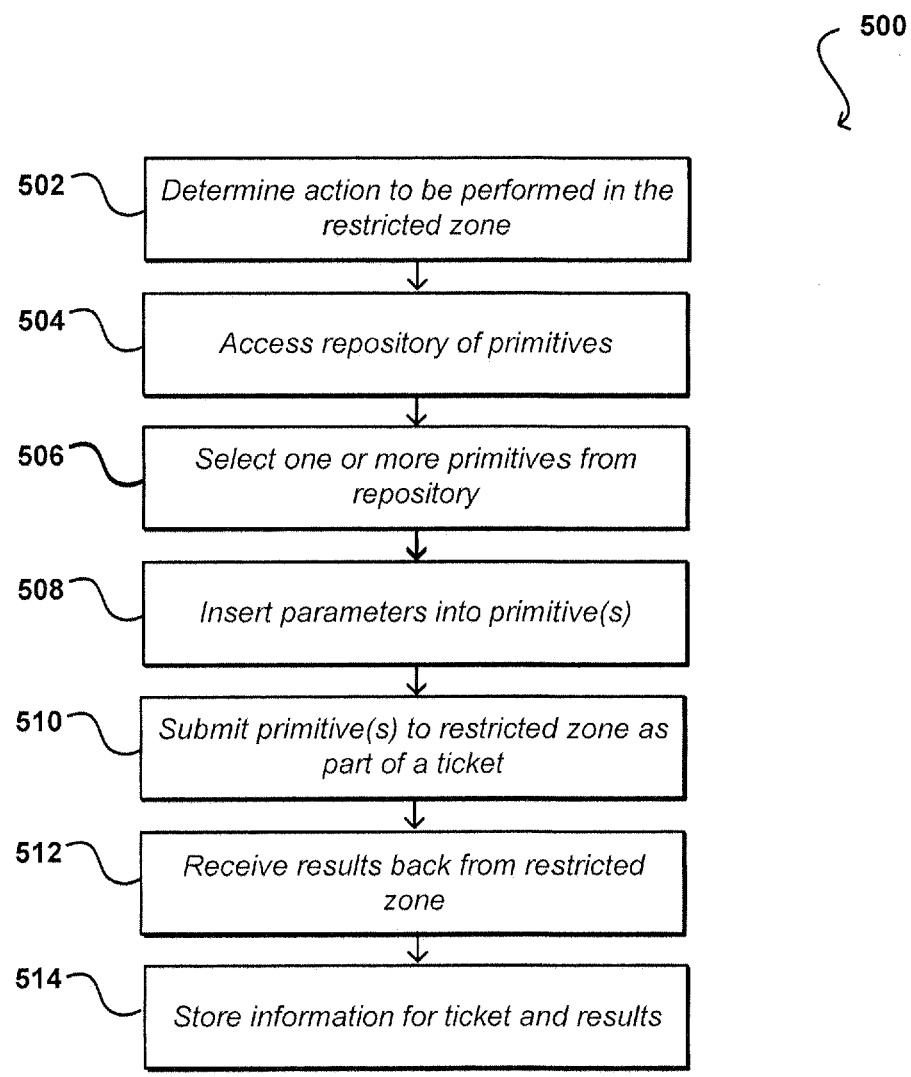
FIG. 5 illustrates an example process for enabling a user to select primitives and submit tickets to a restricted zone that can be used in accordance with various embodiments.

FIG. 5 illustrates another example process 500 for enabling a user to select primitives to be executed in a restricted zone that can be utilized in accordance with various embodiments. In this example, an action to be executed or otherwise performed in a restricted zone is determined 502. A repository containing a set of primitives (and workflows) can be accessed 504 to determine which primitives have been approved for execution in the target restricted zone. A user, application, or other such entity can cause one or more of the primitives (or workflows) to be selected 506, which can cause an action ticket to be generated including the selected primitives (or workflows) and any other appropriate information. A primitive can take any appropriate form, such as in textual form per an appropriate scripting language, although in some embodiments scripts to be executed can be attached to, or identified by, a primitive. The use of a description or scripting language enables a user to specify an action using text files. A user interface can be provided in some embodiments to enable the production of these text files and/or primitives, where the user interface provides the necessary description for the primitives. API or command line interfaces can be utilized as well. As discussed, in at least some embodiments the stored primitives will function like a primitive "template," where a given primitive might require one or more parameter values (e.g., application name) to be specified before the primitive can be properly executed. As discussed, the parameter values can be specified inside or outside the restricted zone, with placeholders added outside the restricted zone if the necessary parameter value is protected. The parameter value(s) (or placeholder(s)) can be inserted 508 into the primitive(s). The ticket can then be submitted 510 to the restricted zone, such as by sending the ticket to an API of the restricted zone using at least one API call.

The ticket will then be evaluated in the restricted zone. As mentioned, in some cases the parameter values for placeholders might need to be determined and inserted inside the restricted zone. Result data will then be received 512 back from the restricted zone. As discussed, the result data can include information such as whether any primitives or workflows were accepted, rejected, or executed, as well as the results of any processing after redaction. Information such as the result data and the information about the primitives or workflows in the ticket can be stored 514 locally and/or in the provider environment in a repository accessible to the user.

Figure 6:
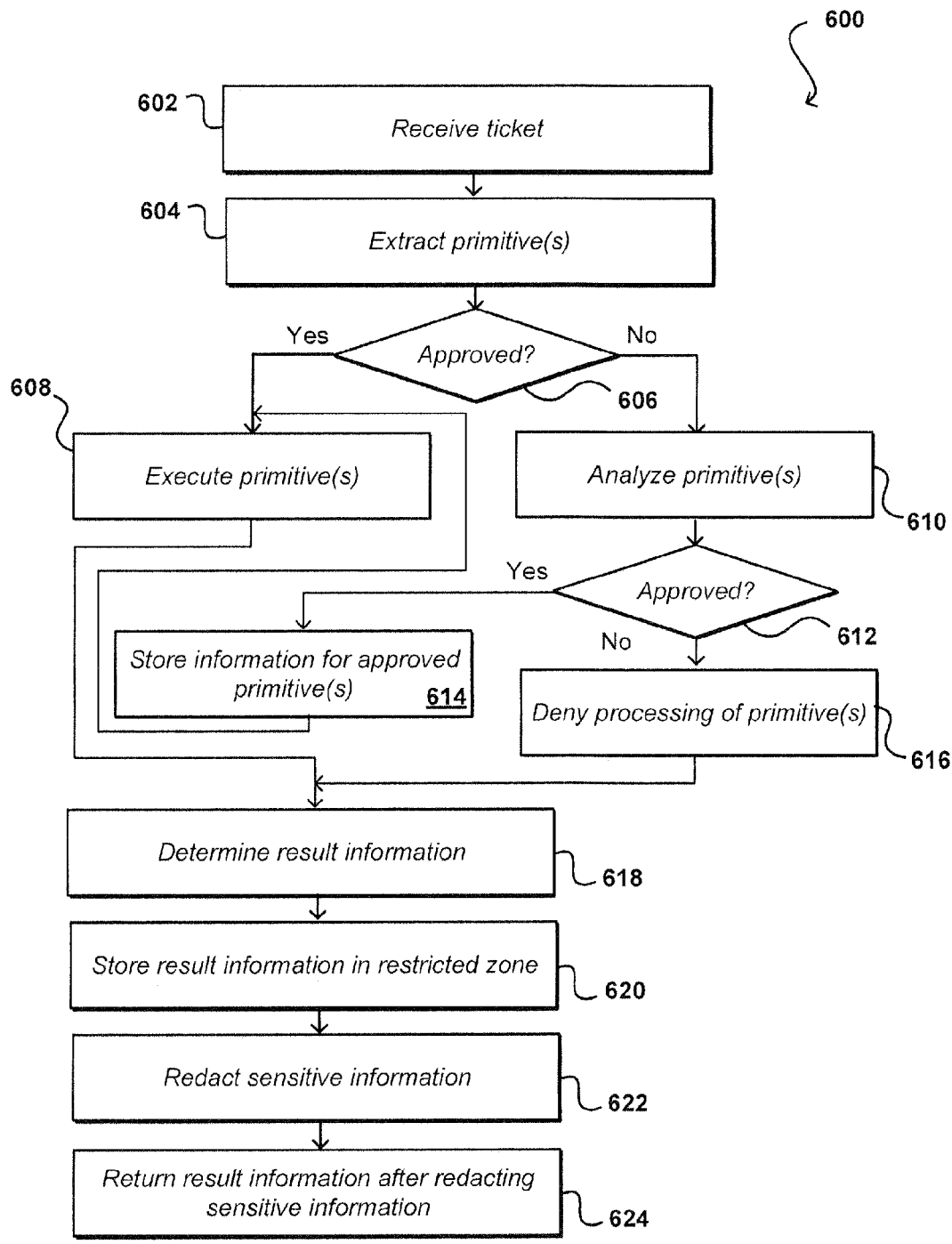
FIG. 6 illustrates an example process for receiving and approving tickets containing primitives to be executed in a restricted zone that can be used in accordance with various embodiments.

FIG. 6 illustrates another example process 600 for receiving, approving, and executing primitives in a restricted zone that can be utilized in accordance with various embodiments. In this example, a ticket is received 602 for processing in the restricted zone. As discussed, the ticket can come from inside, or external to, resources of the restricted zone. Any primitives or workflows associated with the ticket can be extracted 604, and a determination can be made as to whether any or all of the primitives and/or workflows have been previously approved 606. As discussed, this can include performing a lookup against an action repository or similar storage mechanism in order to attempt to locate an approval for the primitives or workflows. If an approval is able to be located for a primitive, that primitive can be executed 608 in the restricted zone. If the primitive is part of a workflow or group of primitives that are to be executed together, the primitive might only be executed if all of the primitives are approved. If a primitive is not already approved, the primitive can be analyzed 610 to determine whether or not the primitive should be approved 612. If the primitive is approved, information for the primitive and/or the approval can be stored 614 to a repository or other appropriate location in the restricted zone. The primitive can then be executed as discussed previously. If it is determined that the primitive should not be approved for execution in the restricted zone, the primitive is denied 616.

Once the primitive(s) has been approved or denied and any approved primitives have been executed, a set of result information can be determined 618 corresponding to the received ticket. At least a portion of this result information can be stored 620 in a repository of the restricted zone. For result data to be sent in response to receiving the ticket, any sensitive information can be redacted 622, as may be in accordance with one or more appropriate policies. This can include inserting placeholders where sensitive data would otherwise exist in the result information. The result information after the redacting can then be returned 624 to the address associated with the user, as well as potentially another repository of the resource provider system for storage as historical data or other such information.

Figure 7:
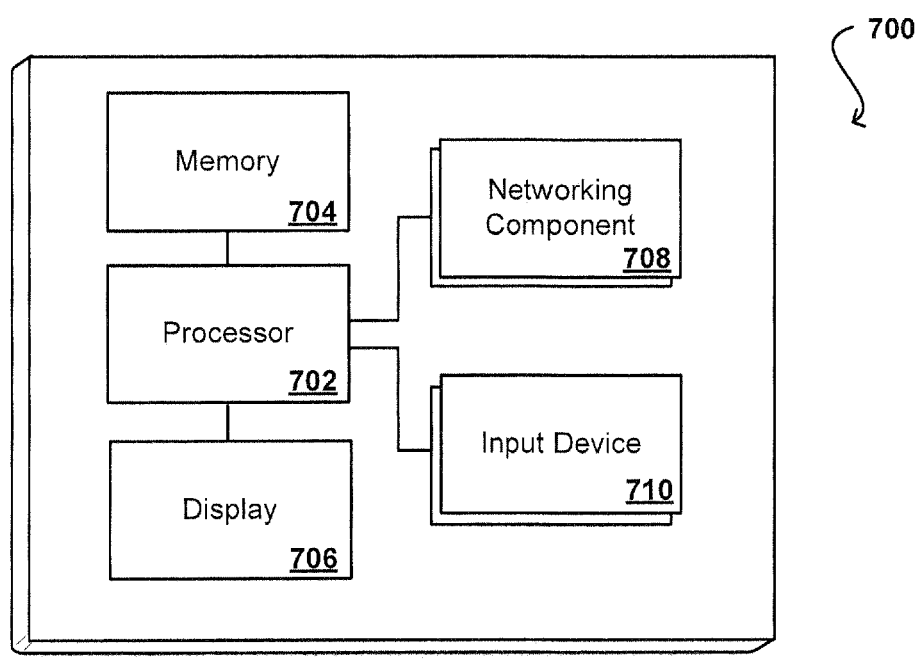
FIG. 7 illustrates a set of components of an example computing device that can be used to perform aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 8:
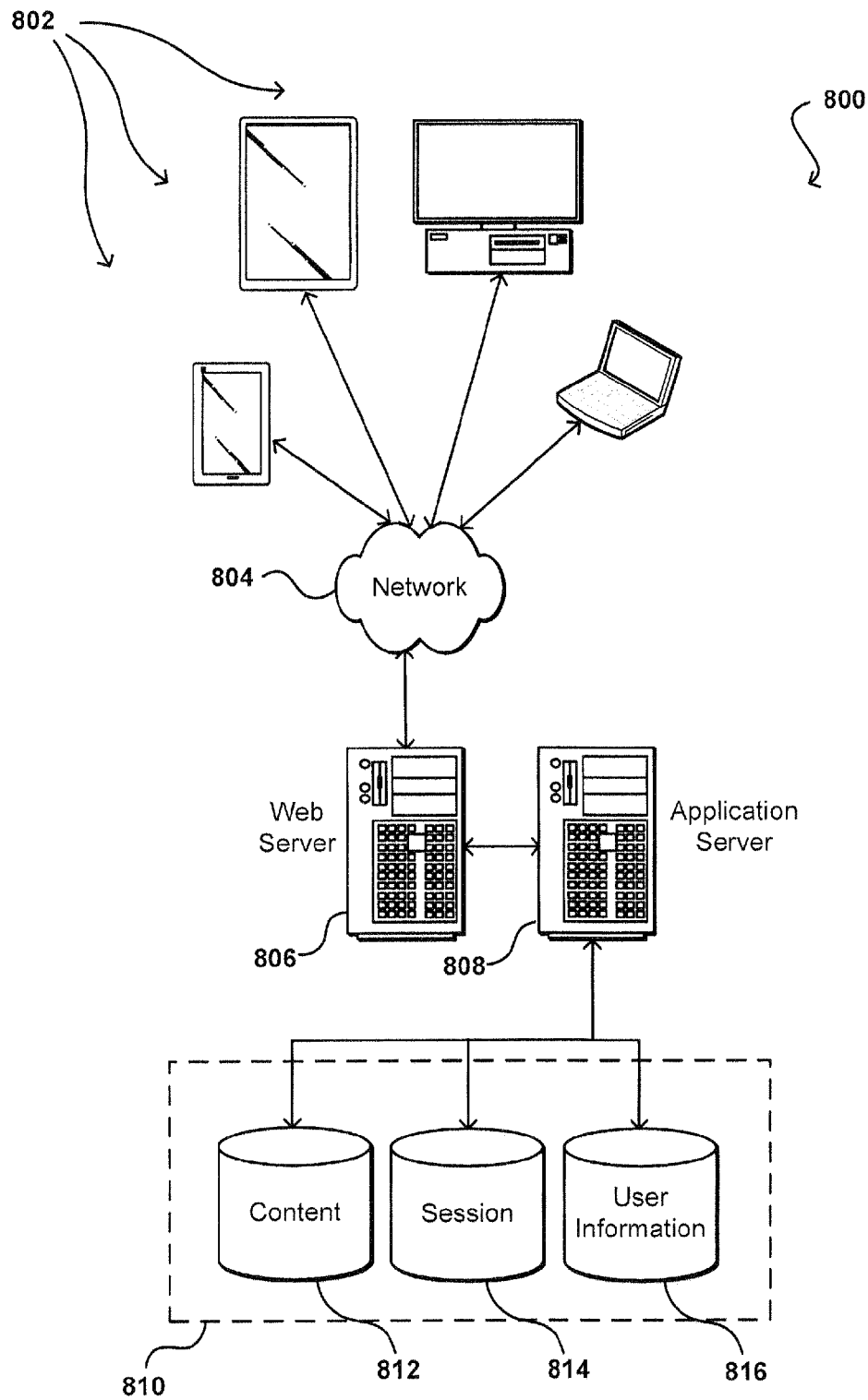
FIG. 8 illustrates an example environment in which aspects of various embodiments can be performed.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the at least one processor, cause the system to:
      determine an action to be performed using at least one resource of a resource provider environment, the at least one resource of the resource provider environment being associated with a restricted zone in the resource provider environment, the restricted zone in the resource provider environment provided for a customer and directly accessible only to people granted at least one corresponding credential on behalf of the customer;
      create a primitive corresponding to the action, the primitive capable of being executed in the restricted zone in the resource provider environment to cause the action to be performed using the at least one resource of the resource provider environment;
      store the primitive to a primitive repository, the primitive repository storing a plurality of primitives and a plurality of workflows, each workflow comprising two or more primitives;
      receive a selection of the primitive from the primitive repository;
      cause a ticket to be generated by a ticket manager component of a control plane, the control plane comprising a virtual layer of hardware and software components for performing control and management actions, and submitted to the restricted zone in the resource provider environment, the ticket including information for the selected primitive and capable of being approved and executed within the restricted zone in the resource provider environment;
      receive, by the ticket manager component, result information regarding at least one of an approval of the primitive, a denial of the primitive, or information resulting from performance of the action in the restricted zone, the information resulting from performance capable of having information redacted before passing from the restricted zone in the resource provider environment, and the information being made available to the components of the control plane; and store at least a portion of the result information in a repository outside the restricted zone in the resource provider environment, wherein the approval of the primitive indicates that the primitive is capable of being executed in the restricted zone in the resource provider environment without requiring another approval.

2. The system of claim 1, wherein the instructions when executed further cause the system to:

determine at least one additional primitive to be executed;

combine the primitive and the at least one additional primitive into a workflow; and enable selection of the workflow for insertion into a ticket and execution in the restricted zone in the resource provider environment.

3. The system of claim 1, wherein the instructions when executed further cause the system to:

determine at least one policy for the action and the restricted zone in the resource provider environment; and generate the primitive according to the at least one policy.

4. The system of claim 1, wherein the instructions when executed further cause the system to:

determine a piece of data prevented from being extracted from the restricted zone in the resource provider environment, the piece of data needed for inclusion in the primitive for execution in the restricted zone in the resource provider environment; and insert, into the primitive, a placeholder for the piece of data, a value for the piece of data capable of being inserted in place of a respective placeholder when the primitive is inside the restricted zone in the resource provider environment.

5. A computer-implemented method, comprising:

determining an action to be performed using a resource of a resource provider environment;

creating a primitive corresponding to the action, the primitive capable of being processed to cause the action to be performed using the resource of the resource provider environment;

receiving, on behalf of an authorized user, a request for the primitive;

providing the primitive in response to the request, the primitive capable of being included in a ticket to be generated by a ticket manager component of a control plane, the control plane comprising a virtual layer of hardware and software components for performing control and management actions, and submitted to cause the action associated with the primitive to be performed using the resource of the resource provider environment, wherein the resource of the resource provider environment is capable of being one of a set of restricted resources preventing the action from being directly submitted to the resource of the resource provider environment for performance; and receiving result information related to the primitive b the ticket manager component, the information being made available to the components of the control plane.

6. The computer-implemented method of claim 5, further comprising:

receiving result information regarding at least one of an approval of the primitive, a denial of the primitive, or information resulting from the performance of the action associated with the primitive; and storing at least a portion of the result information, wherein the approval of the primitive indicates that the primitive is capable of being processed by the set of restricted resources without another approval.

7. The computer-implemented method of claim 5, further comprising:

determining at least one piece of restricted information for the primitive that is restricted from being obtained from the set of restricted resources; and causing a placeholder to be inserted in the primitive for each piece of restricted information.

8. The computer-implemented method of claim 5, further comprising:

determining at least one additional primitive to be processed with the primitive; and generating a workflow including the primitive and the at least one additional primitive, the workflow capable of being included in the ticket to be generated and submitted to the set of restricted resources.

9. The computer-implemented method of claim 5, further comprising:

determining that the set of restricted resources is part of a restricted zone associated with a customer; and maintaining a mirrored set of resources outside the restricted zone, wherein the primitive is capable of being tested against the mirrored set of resources.

10. The computer-implemented method of claim 5, further comprising:

determining a type of the resource of the resource provider environment for use in performing the action, wherein the type of the resource of the resource provider environment is at least one of a server, a networking component, firmware, operating system software, middleware, application software, a security service, or a third party service.

11. The computer-implemented method of claim 5, further comprising:

generating a rollback primitive, the rollback primitive capable of being included in a ticket to be generated and submitted to enable the action associated with the primitive to be undone using the resource of the resource provider environment.

12. The computer-implemented method of claim 5, further comprising:

analyzing at least one policy associated with the set of restricted resources; and associating information with the primitive indicating whether the primitive is capable of being submitted to the set of restricted resources according to the at least one policy.

13. The computer-implemented method of claim 5, wherein the action includes at least one of a configuration operation or a management operation for at least a subset of the set of restricted resources.

14. A non-transitory computer-readable storage medium storing instructions that, when executed by at least one processor of a computer system, cause the computer system to:

receive a ticket generated by a ticket manager component of a control plane, the control plane comprising a virtual layer of hardware and software components for performing control and management actions, the ticket including a primitive, the primitive specifying an action to be performed using a resource in a restricted zone, the restricted zone being a portion of a resource environment managed by a resource provider, the resource provider being restricted from directly accessing the resource in the restricted zone;

enable the action to be performed using the resource when an approval exists for the primitive in the restricted zone;

cause the primitive to be reviewed when no approval or denial exists for the primitive in the restricted zone, wherein a person having a credential enabling access to resources of the restricted zone is enabled to review the primitive and cause an approval or denial to be generated for the primitive, generation of an approval causing the action to be performed using the resource; and return information to the ticket manager component about at least one of the approval, the denial, or information about performance of the action by the resource, the information being made available to the components of the control plane.

15. The non-transitory computer-readable storage medium of claim 14, wherein the instructions when executed further cause the computer system to:

determine at least one additional primitive included in the ticket; and cause the primitive and the at least one additional primitive to be processed in the restricted zone only when a respective approval exists for each of the primitive and the at least one additional primitive.

16. The non-transitory computer-readable storage medium of claim 14, wherein the instructions when executed further cause the computer system to:

redact, from the information returned in response to receiving the ticket, any data restricted from being sent outside the restricted zone.

17. The non-transitory computer-readable storage medium of claim 14, wherein the instructions when executed further cause the computer system to:

analyze at least one policy for the restricted zone to determine whether to provide an approval for the primitive.

18. The non-transitory computer-readable storage medium of claim 14, wherein the instructions when executed further cause the computer system to:

enable the person having the credential enabling access to resources of the restricted zone to filter primitives by whether an approval exists for each of the primitives.

19. The non-transitory computer-readable storage medium of claim 14, wherein the action relates to management of the resource in the restricted zone.

20. The non-transitory computer-readable storage medium of claim 14, wherein the instructions when executed further cause the computer system to:

determine a placeholder in the primitive included in the received ticket;

determine restricted information stored in the restricted zone corresponding to the placeholder; and replace the placeholder with the restricted information before causing the primitive to be processed using the resource.

* * * * *